Feb. 1, 1927. 1,615,938
A. J. ERICKSON
HELICOPTER WING
Filed April 13, 1925
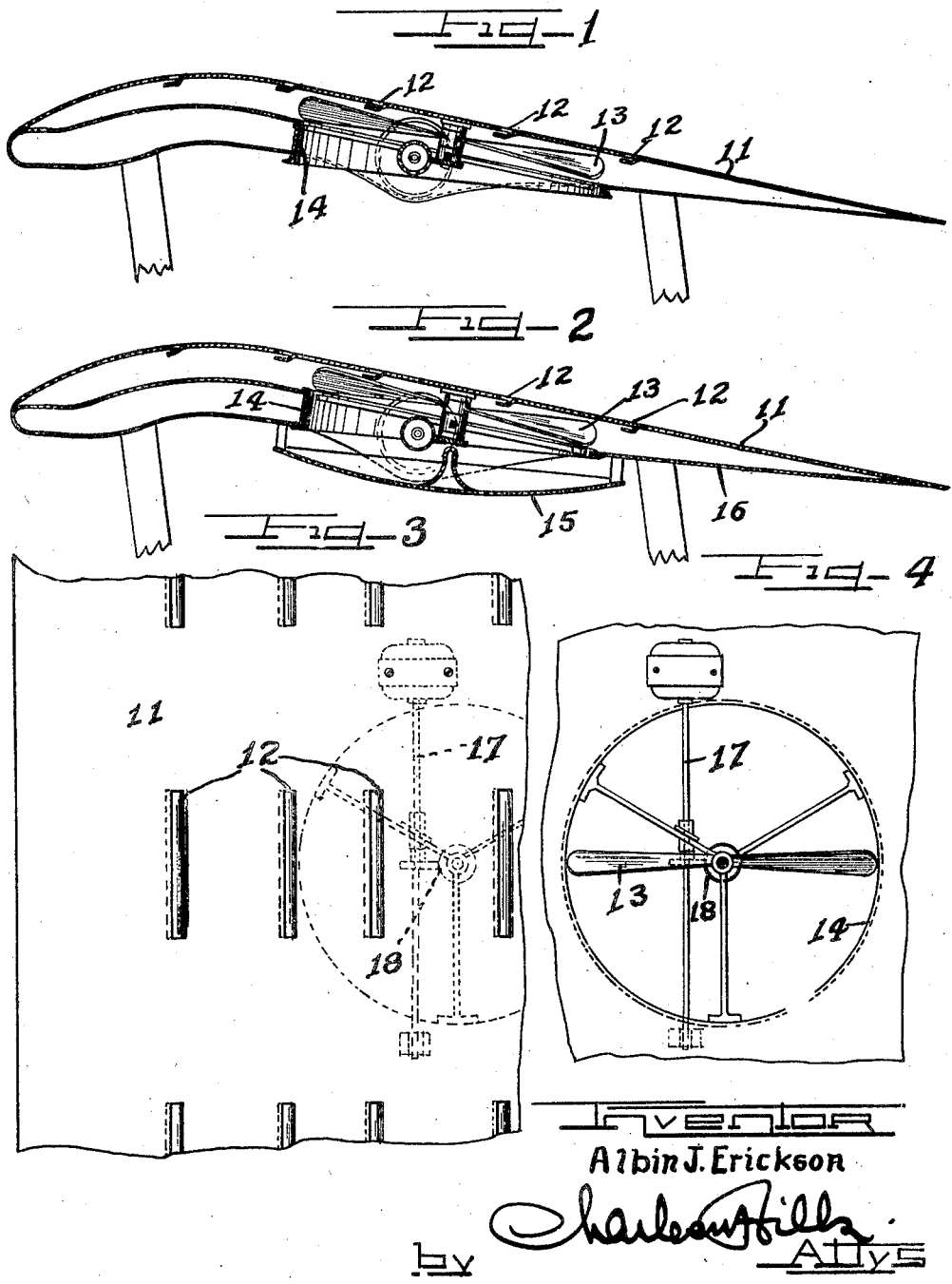
INVENTOR
Albin J. Erickson
by Charles Hills
Attys Patented Feb. 1, 1927.

1,615,938

UNITED STATES PATENT OFFICE.

ALBIN J. ERICKSON, OF CHICAGO, ILLINOIS.

HELICOPTER WING.

Application filed April 13, 1925. Serial No. 22,509.

This invention relates to increasing the lift of airplane wings and has particular reference to reducing the required landing speed of the plane without affecting the high speed characteristics of the wing curve.

It is an object of this invention to provide an improved airplane wing providing a variable lift mechanism to give a two speed wing. Heretofore wing curves giving characteristics suitable for high speed have had the inherent fault and danger of a corresponding high landing speed, i. e., the minimum speed sufficient for sustaining the airplane has been too high for safe landing. It has been attempted to attain a low landing speed by changing the wing characteristics by either a change of wing profile or a change of wing area, both changes necessarily taking place during flight and requiring complicated mechanism that has not yet been satisfactorily reduced to commerical practice.

It is therefore an object of this invention to provide an airplane wing having an auxiliary lift increasing mechanism, whereby the wing profile may be chosen for maximum speed conditions and the lifting power thereof increased at will to provide sufficient lifting power to enable a slow landing speed.

Other and further important objects of this invention will be apparent from the disclosures in the specification and the accompanying drawings.

This invention (in a preferred form) is illustrated in the drawings and hereinafter more fully described.

On the drawings:

Figure 1 is a section of an airplane wing incorporating one form of the device of this invention.

Figure 2 is a similar section having a modified form of the device of this invention.

Figure 3 is fragmentary top plan view of the wing with the device outlined in dotted lines.

Figure 4 is a similar view with the top cover of the wing removed.

As shown on the drawings:

An airplane wing section of conventional profile is shown in the drawings, the wing beams and internal bracing being omitted for purposes of clearness. The upper wing covering 11 is provided with a number of air intakes 12 preferably arranged to accentuate the suction effect above the wing. A propeller 13 is mounted within the wing and surrounded by a housing or fan intake 14, the propeller delivering air to the under side of the wing through the housing either directly in a downward direction, as in Figure 1, or in connection with a deflector 15, as in Figure 4, functioning to deflect the air stream against the lower wing surface 16. This deflector serves to recover energy from the air stream in the manner of the hydraulic turbine draft tubes. The under side of this reflector is formed to act in conjunction with the balance of the lower wing surface to give the maximum lifting effect.

The propellers are preferably arranged in a row along the wing and may be either individually driven or driven from a common jack shaft 17 by means of the gearing 18.

The air pressure conditions surrounding an airplane wing in flight comprises a region of reduced or sub-atmospheric pressure above the wing and a region of increased pressure below the wing. By introducing a propeller within the wing and drawing air through the upper wing surface, the air pressure above the wing is further reduced giving an increased lifting force. The air discharged below the wing also increases the lifting power of the wing by augmenting the pressure therebelow.

When an airplane is preparing to land, a low speed is essential for safety, both to reduce the landing shocks and to reduce the length of run. However, an efficient high speed wing curve also means a relatively high landing speed, during which period the engine has a large excess of power available for the operation of the lifting propellers which serve to materially increase the low speed lift of the wing and therefore permit a considerable reduction of landing speed.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

In an airplane wing, a propeller mounted in the wing with its axis substantially normal to the wing surface, a housing surrounding said propeller and having inlets and outlets adapted to draw air from above the wing and discharge the air below the wing, and a deflecting plate adjacent the under surface of the wing adapted to increase the air pressure below the wing.

In testimony whereof I have hereunto subscribed my name.

ALBIN J. ERICKSON.